(12) United States Patent
Askeland et al.

(10) Patent No.: US 10,831,202 B1
(45) Date of Patent: Nov. 10, 2020

(54) ONBOARD USE OF SCENARIO DESCRIPTION LANGUAGE

(71) Applicant: Zoox, Inc., Menlo Park, CA (US)

(72) Inventors: Jacob Lee Askeland, San Jose, CA (US); Ryan Martin Cahoon, Mountain View, CA (US); Gary Linscott, Cupertino, CA (US)

(73) Assignee: Zoox, Inc., Foster City, CA (US)

( * ) Notice: Subject to any disclaimer, the term of this patent is extended or adjusted under 35 U.S.C. 154(b) by 115 days.

(21) Appl. No.: 15/694,097

(22) Filed: Sep. 1, 2017

(51) Int. Cl.
G05D 1/02 (2020.01)
G05D 1/00 (2006.01)
G05B 17/02 (2006.01)

(52) U.S. Cl.
CPC .......... *G05D 1/0212* (2013.01); *G05B 17/02* (2013.01); *G05D 1/0088* (2013.01)

(58) Field of Classification Search
CPC ............ G06F 17/5009; G06F 17/5095; G05D 1/0088; G05D 1/0212; G05B 17/02
See application file for complete search history.

(56) References Cited

U.S. PATENT DOCUMENTS

| | | | |
|---|---|---|---|
| 8,989,945 B2 | 3/2015 | Callow | |
| 9,511,767 B1 | 12/2016 | Okumura et al. | |
| 9,645,577 B1 | 5/2017 | Frazzoli et al. | |
| 9,740,944 B2* | 8/2017 | Micks | G06K 9/209 |
| 2016/0210382 A1 | 7/2016 | Alaniz et al. | |
| 2017/0076019 A1* | 3/2017 | Nallapa | G09B 9/04 |
| 2017/0109928 A1* | 4/2017 | Micks | G09B 9/00 |
| 2017/0115396 A1* | 4/2017 | Uehara | G01S 17/86 |
| 2018/0107770 A1 | 4/2018 | Cahoon et al. | |
| 2018/0203445 A1* | 7/2018 | Micks | G06N 7/005 |
| 2018/0267538 A1* | 9/2018 | Shum | G06F 17/5009 |
| 2020/0050721 A1 | 2/2020 | Cahoon et al. | |

OTHER PUBLICATIONS

O'Kelly, "APEX, Autonomous Vehicle Plan Verification and Execution", SAE Technical Paper Series, Apr. 14, 2016, pp. 1-12.
The PCT Search Report and Written Opinion dated Jan. 15, 2018 for PCT applicaiton No. PCT/US2017/056398, 18 pages.
(Continued)

*Primary Examiner* — Rachid Bendidi
(74) *Attorney, Agent, or Firm* — Lee & Hayes, P.C.

(57) ABSTRACT

A domain specific language for use in constructing simulations within real environments is described. In an example, a computing device associated with a vehicle can receive, from one or more sensors associated with the vehicle, sensor data associated with an environment within which the vehicle is positioned. In an example, the vehicle can be an autonomous vehicle. The computing device associated with the vehicle can receive simulated data associated with one or more primitives that are to be instantiated as a scenario in the environment. The computing device can merge the sensor data and the simulated data to generate aggregated data and determine a trajectory along which the vehicle is to drive based at least in part on the aggregated data. The computing device can determine instructions for executing the trajectory and can assess the performance of the vehicle based on how the vehicle responds to the scenario.

20 Claims, 7 Drawing Sheets

(56) References Cited

OTHER PUBLICATIONS

Sippl, et al., "From Simulation Data to Test Cases for Fully Automated Driving and ADAS", Testing Software and Systems, ICTSS 2016, Lecture Notes in Computer Science, vol. 9976, No. 558, Oct. 4, 2016, pp. 191-206.
Office action for U.S. Appl. No. 15/405,649, dated Jan. 11, 2019, Cahoon, "Scenario Description Language", 11 pages.
Wood, et. al., "Representation theory and invariant neural networks" Discreet Applied Mathematics 69, 1996, pp. 33-60.
Zurada, et.al, "Perturbation method for deleting redundant inoputs of perceptron networks", Neurocomputing 14, 1997, pp. 177-193.
Haubrich,, et al. "Integration of Road Network Logics into Virtual Environments", Mar. 2014, <<https://www.researchgate.com/publication/261365483>>, 11pages.
Paielli, Russell A. "Automated Generation of Air Traffic Encounters for Testing Conflict-Resolution Software", Journal of Aerospace Information Systems, vol. 10, No. 5, May 2013, pp. 209-217.

\* cited by examiner

ONBOARD USE OF SCENARIO DESCRIPTION LANGUAGE

BACKGROUND

An interaction of objects with one another in an environment given specified starting conditions, can generally be referred to as a scenario. Various parameters of a system, such as robustness, can be categorized based on outcomes (i.e., the end result) of the scenarios given input from the system. Often, physical testing or validation of a particular scenario is neither viable nor possible. For sufficiently simple scenarios, it can be possible to obtain analytical solutions for testing or validation purposes, incorporating physical approximations where necessary. However, where situations become too complex, analytical solutions may not be viable. In such situations, testing and validation is done through the use of simulations. As one example, simulations have been used to test operating software for autonomous vehicles. These simulations attempt to recreate the world, and obstacles within it, so as to accurately reproduce scenarios which can be encountered by an autonomous vehicle.

BRIEF DESCRIPTION OF THE DRAWINGS

The techniques described herein will now be described, by way of example, with reference to the accompanying drawings, where like numerals denote like elements and in which.

DETAILED DESCRIPTION

Figure 1:
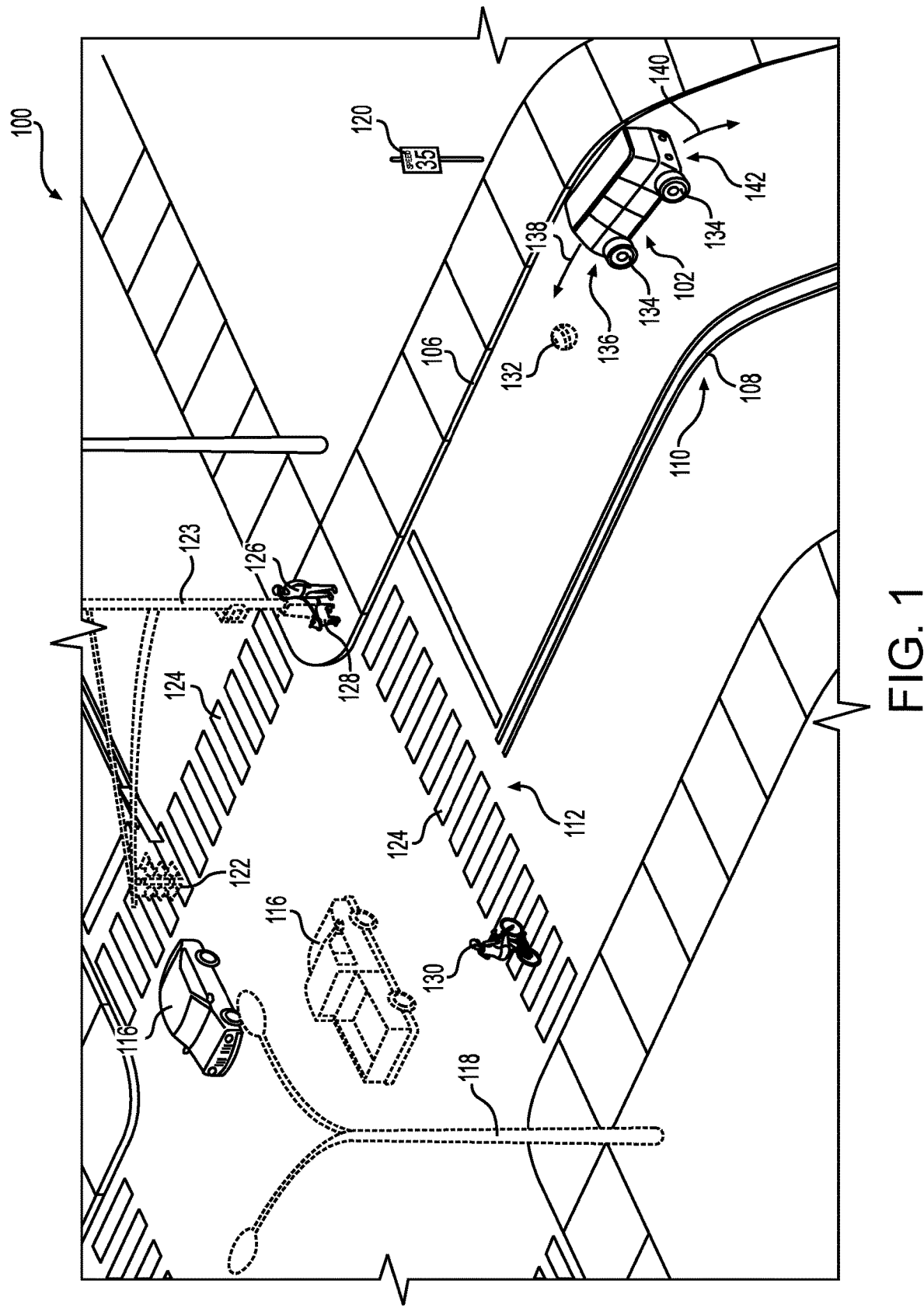
FIG. 1 illustrates an example environment in which an autonomous vehicle is positioned.

The following detailed description is directed to techniques for creating a domain specific language for use in augmenting real environments with simulated data. The domain specific language can enable a user to concisely describe, at a high level, scenarios that are to be simulated. The domain specific language can be executable by a computer system to instantiate scenarios in an environment. The environment can be a real environment and/or a simulated environment. In at least one example, a real environment can correspond to one or more objects that interact with a map. A simulated environment can be constructed through the use of primitives which interact with a map. Primitives can include, but are not limited to, entities (which can be either static or dynamic), entity behaviors, actions, conditions, noises, faults, etc. In at least one example, a scenario can include one or more primitives that interact with a map. In some examples, entities can be associated with a coordinate system (e.g., a two-dimensional or three-dimensional coordinate system), such as an inertial coordinate system, a track based coordinate system, a map based coordinate system, or the like, in which a position and/or velocity of an entity can be described. Such scenarios can be enumerated in a scenario description language (SDL) that can be expressed in a Scenario Definition Format (SDF), which can be an intermediate, machine-readable format read by a computer device. Additionally, as will be discussed in detail below, primitives can be described using a temporal logic (e.g., linear temporal logic, signal temporal logic, etc.). As a non-limiting example, one scenario can be defined as one entity, a car for example, having certain dimensions and velocity, positioned to be a predetermined distance ahead of a test autonomous vehicle along a roadway.

In at least one example, techniques described herein are directed to utilizing the domain specific language onboard an autonomous vehicle to present simulated scenarios in an environment within which the autonomous vehicle is positioned. Techniques described herein are useful for testing multiple scenarios at various times, which can increase the efficiency with which the performance of an autonomous vehicle can be evaluated. Furthermore, techniques described herein are useful for generating scenarios that are not otherwise easy, or safe, to replicate in a real environment. For instance, techniques described herein can be useful for testing how an autonomous vehicle responds to unanticipated objects that are projected into, or otherwise enter, a path of travel of the autonomous vehicle. Examples of such objects can include balls, dogs, people, etc. In such instances, a real reaction of the vehicle may be tested, despite the data source being simulated.

As a non-limiting example, an autonomous vehicle can receive sensor data via one or more sensors associated with the autonomous vehicle. The sensor data can be used to identify real objects in the real environment within which the autonomous vehicle is positioned. The sensor data can be provided to a computer system associated with the autonomous vehicle (e.g., an autonomous controller). Simulated data, which can be based on SDL and can define a simulated object (e.g., a ball, a dog, a person, etc.) that is to enter a path of travel of the autonomous vehicle, can be provided to the computer system. The sensor data and the simulated data can be merged by the computer system such that the computer system has no idea that the object is simulated. The autonomous vehicle can be expected to reach the simulated object and slow to a stop (or execute some other safety maneuver). The actual performance of the autonomous vehicle can be evaluated to determine if the autonomous vehicle performed as expected (e.g., passed or failed). Various other simulated scenarios can be imagined for evaluating the performance of autonomous vehicles.

Though the technologies described can be generally applicable to various simulated environments, for the purpose of brevity, the detailed discussion is directed to examples involving vehicles. As described above, many industries use simulated environments for testing and validation. As a non-limiting example, simulations can be used to validate software and/or computer system(s) (e.g., an autonomous controller) being run on autonomous vehicles to ensure that the software and/or computer system(s) is able to safely control such autonomous vehicles. In additional and/or alternative examples, simulations can be used to learn about the constraints of autonomous vehicles running based on the software and/or computer system(s). For instance, simulations can be used to understand the operational space of an autonomous vehicle (i.e., the envelope of parameters in which the software and/or computer system(s) effectively controls the autonomous vehicle) in view of surface conditions, ambient noise, faulty components, etc. Simulations can also be useful for generating feedback for improving operations and designs of autonomous vehicles. For instance, in some examples, simulations can be useful for determining an amount of redundancy that is required in the software and/or computer system(s), or how to modify a behavior of the software and/or computer system(s) based on what is learned through simulations. Furthermore, in additional and/or alternative examples, simulations can be useful to inform the hardware design of autonomous vehicles, such as optimizing placement of sensors on an autonomous vehicle.

More details are provided below with reference to FIGS. 1-7.

FIG. 1 is a schematic diagram of an example environment 100 through which an example vehicle 102 travels. The example environment 100 includes a road 104 having an edge 106 and a center line 108 providing a guide for the path of the vehicle 102. In the example environment 100 shown, the road 104 includes a curve 110 and crosses an intersection 112 with a crossroad 114 on which other vehicles 116 travel. The example environment 100 also includes a plurality of objects. The example environment 100 can include real objects or simulated objects. For the purpose of this discussion, a real object can correspond to an object that is physically present in an environment. A simulated object can correspond to an object that is not physically present in an environment, but can be instantiated in an environment such that it is simulated (e.g., not actually present) in the environment. To differentiate between real objects and simulated objects, real objects are illustrated in solid lines and simulated objects are illustrated in dashed lines.

In at least one example, the environment 100 includes a light post 118 and a traffic sign 120 that provides notification of a local vehicle operation law or regulation, such as a speed limit, or other information relating to the immediate vicinity of the road 104. The example environment 100 also includes a traffic signal 122 mounted on a post 123 for managing traffic flow through the intersection 112. In the example shown, the traffic signal 122 includes a traffic light providing an indication of whether the vehicle 102 is permitted to proceed through the intersection 112, whether the vehicle 102 must stop and wait for a signal before proceeding through the intersection 112, and a warning that the traffic signal 122 is about to change to an indication that the vehicle 102 must stop at the intersection 112. In addition, the example environment 100 also includes a crosswalk 124 providing pedestrians and cyclists with a guide for crossing the road 104 and at the crossroad 114. Also present in the example environment 100 shown in FIG. 1 is a pedestrian 126 with a dog 128 at an edge 106 of the road 104 and approaching the crosswalk 124 for crossing the road 104. In addition, the environment 100 includes a cyclist 130 crossing the road 104 on the crosswalk 124. The example environment 100 also includes a ball 132, which is positioned in the road 104 between the vehicle 102 and the intersection 112.

As described above, techniques described herein are directed to integrating simulated objects into an environment (e.g., real or simulated) to determine how a vehicle (e.g., the vehicle 102) responds. FIG. 1 includes various simulated objects, which are illustrated in dashed lines to distinguish such objects as simulated objects instead of real objects. For instance, the vehicle 116, the light post 118, the traffic signal 122, the post 123, and the ball 132 are all simulated objects in the example environment 100. That is, the vehicle 116, the light post 118, the traffic signal 122, the post 123, and the ball 132 are not physically present in the real world, but the vehicle 116, the light post 118, the traffic signal 122, the post 123, and the ball 132 are indistinguishable from real objects by the vehicle 102.

In at least one example, techniques described herein can utilize the simulated data to instruct various objects in the environment (real or simulated) how to behave. For instance, techniques described herein can be used to control the behavior of the traffic signal 122, whether the traffic signal is simulated (as shown) or real. Or, techniques described herein can be used to control the behavior of other autonomous vehicles in an environment. Additional details are described below.

For the purpose of illustration, the vehicle 102 can be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In that case, since the vehicle 102 can be configured to control all functions from start to stop, including all parking functions, it can be unoccupied. This is merely an example, and the systems and methods described herein can be incorporated into any ground-borne, airborne, or waterborne vehicle, including those ranging from vehicles that need to be manually controlled by a driver at all times, to those that are partially or fully autonomously controlled.

The example vehicle 102 shown in FIG. 1 is an automobile having four wheels 134 and respective tires for each of the wheels 134. Other types and configurations of vehicles are contemplated, such as, for example, vans, sport utility vehicles, cross-over vehicles, trucks, buses, agricultural vehicles, and construction vehicles. The vehicle 102 can be powered by one or more internal combustion engines, one or more electric motors, hydrogen power, any combination thereof, and/or any other suitable power sources. In addition, although the example vehicle 102 has four wheels 134, the systems and methods described herein can be incorporated into vehicles having fewer or a greater number of wheels, tires, and/or tracks. The example vehicle 102 has four-wheel steering and can operate generally with equal performance characteristics in all directions, for example, such that a first end 136 of the vehicle 102 is the front end of the vehicle 102 when travelling in a first direction 138, and such that the first end 136 becomes the rear end of the vehicle 102 when traveling in the opposite, second direction 140, as shown in FIG. 1. Similarly, a second end 142 of the vehicle 102 is the front end of the vehicle 102 when travelling in the second direction 140, and such that the second end 142 becomes the rear end of the vehicle 102 when traveling in the opposite, first direction 138. These example characteristics can facilitate greater maneuverability, for example, in small spaces or crowded environments, such as parking lots and urban areas.

Figure 2:
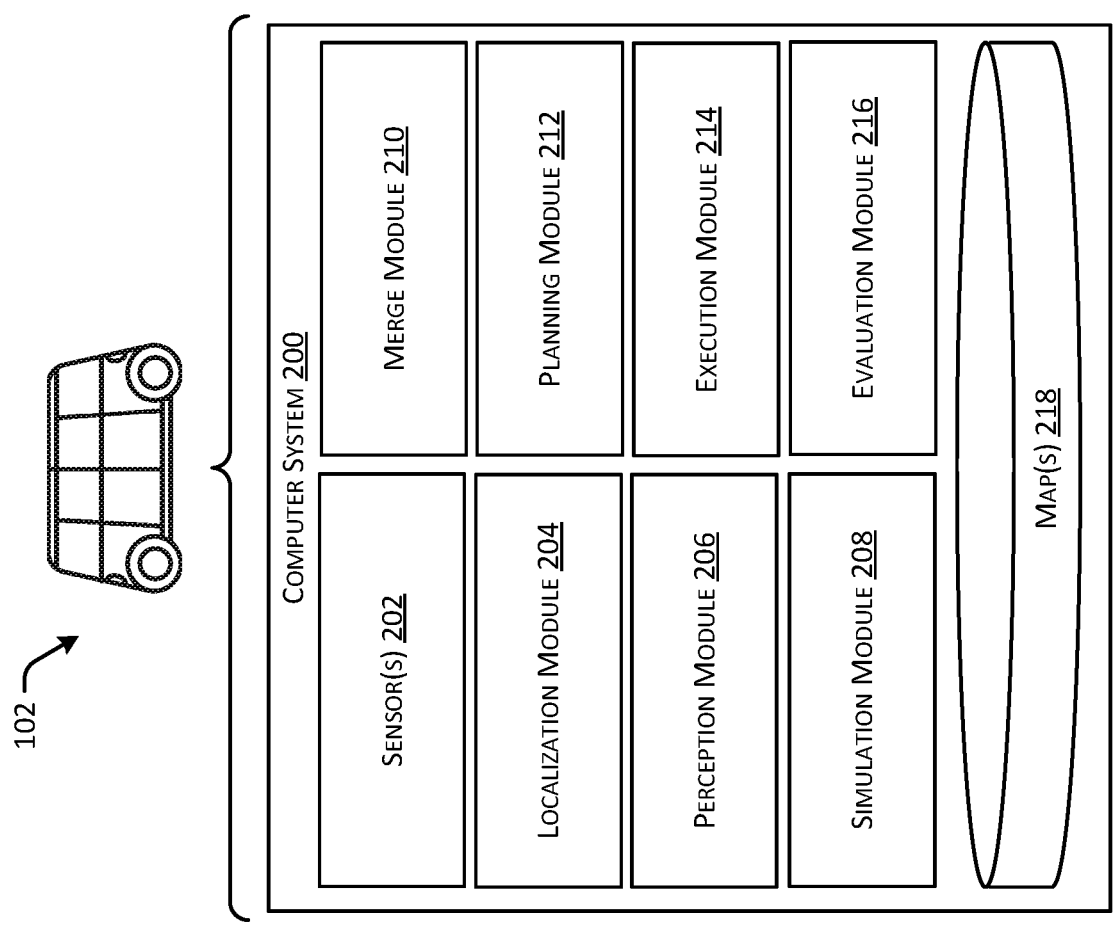
FIG. 2 illustrates an example architecture in which scenario description language is utilized onboard an autonomous vehicle to generate simulated scenarios in an environment.

FIG. 2 illustrates an example computer system 200 in which scenario description language is utilized onboard an autonomous vehicle to generate simulated scenarios in an environment. Though depicted in FIG. 2 as a single system for illustrative purposes, one or more of the components and/or modules described herein may be distributed across any number of systems. That is, computer system 200 can be a single system or a distributed system.

Computer system 200 can include one or more sensors 202, a localization module 204, a perception module 206, a simulation module 208, a merge module 210, a planning module 212, an execution module 214, and an evaluation module 216. Additionally, computer system 200 can include one or more maps 218. Additional details associated with the computer system are described below with reference to FIG. 7.

Sensor(s) 202 can include light detection and ranging (LIDAR) sensors for capturing LIDAR data for image segmentation and/or classification, camera sensors for capturing vision data for segmentation and/or classification, radio detection and ranging (RADAR) sensors for capturing range, angle, and/or velocity of objects in an environment, sound navigation and ranging (SONAR) sensors for capturing acoustic information of objects in an environment (e.g., ultrasonic transducers), etc. Additionally, the sensor(s) 202 can include wheel encoders, microphones, inertial measurement unit(s) (IMU), accelerometers, gyroscopes, magnetometers, temperature sensors, humidity sensors, light sensors, global positioning system (GPS) sensors, etc. Each of the sensor(s) 202 described above can generate sensor data that can be processed by other modules, as described below.

Localization module 204 can be configured to determine a position of the vehicle 102 in an environment, such as with respect to a map. In at least one example, the localization module 204 can access a portion of a map (e.g., from map(s) 218, described below) and, based on sensor data received from the sensor(s) 202, the localization module 204 can determine a position of the vehicle 102 relative to the map. In at least one example, the localization module 204 can receive sensor data from one or more of the sensors 202 (e.g., LIDAR sensors, camera sensors, RADAR sensors, SONAR sensors, wheel encoders, microphones, IMUs, accelerometers, gyroscopes, magnetometers, temperature sensors, humidity sensors, light sensors, GPS sensors, etc.) and can process the sensor data to identify objects and determine information about the objects in the environment. The localization module 204 can process sensor data received from the one or more sensors to determine a state of the vehicle 102 at a particular time. That is, the localization module 204 can process data received from the one or more sensors to determine a position of the vehicle 102 at a particular time, an orientation of the vehicle 102 at a particular time, a velocity of the vehicle 102 at a particular time, etc. In at least one example, the localization module 204 can determine the state of the vehicle 102 in relation to a map.

Perception module 206 can be configured to perform data analysis on data from sensors 202, such as segmentation and classification, to identify and/or classify objects in the environment. In at least one example, the perception module 206 can determine a size of the object, a position of the object in the environment, etc. In an example, the perception module 206 can associate objects with a map. In some examples, the perception module 206 can classify objects and associate the objects with a map at substantially the same time. Furthermore, in additional and/or alternative examples, the perception module 206 can track where an identified object has been and/or estimate where the identified object is going. Objects and associations between objects and a map can be associated with perception data. That is, perception data can identify objects in an environment. In at least one example, perception data can be used to determine how the vehicle 102 is moving through its surrounding environment.

Simulation module 208 can be configured to receive instructions to generate a scenario within an environment. The instructions can correspond to SDL, as described below with reference to FIG. 3. In at least one example, the simulation module 208 can receive instructions defining a plurality of primitives and a sequence defining an association between individual primitives of the plurality of primitives. The simulation module 208 can instantiate the sequence to generate a scenario in an environment. In at least one example, the simulation module 208 can leverage at least some of the sensor data and/or outputs of the localization module 204 and/or perception module 206 to determine a location and/or timing associated with generating the scenario in the environment. In at least one example, the simulation module 208 can instantiate the sequence relative to a map. In such an example, the map can correspond to the same map of the environment within which the vehicle 102 is positioned. Additional details associated with generating scenarios are described below with reference to FIG. 3. For the purpose of this discussion, data associated with generating scenario(s) can be referred to as simulated data.

Merge module 210 can be configured to merge data from different sources to generate aggregated data. In at least one example, one of the sources can be a real data source and another of the sources can be a simulated data source. In at least one example, merge module 210 can be a multiplexer, which can combine data from one or more sources into a single data set. In at least one example, a programmer can provide instructions on how the data from the one or more sources is to be combined, and such instructions can be stored in a configuration file. In some examples, data associated with a first data source can override data from a second data source. For the purpose of this discussion, overriding a data source can correspond to "writing over" or "replacing" simulated data with real data or vice versa. That is, in some examples, data from a real data source can write over and/or replace data from a simulated data source, or vice versa. In additional and/or alternative examples, data associated with a first data source can be merged with data from a second data source. That is, in such examples, data from a real data source can be merged with data from a simulated data source. In yet another example, data associated with a first data source can be dropped (e.g., due to being overridden by data associated with a second data source). That is, in such examples, data from a real data source can be written over and/or be replaced with data from a simulated data source, or vice versa.

In some examples, merge module 210 can merge data from different sensor sources. For instance, in some examples, merge module 210 can merge sensor data from sensor(s) 202 with simulated data generated by simulation module 208. In such examples, an output of the merge module 210 can be aggregated data corresponding to information about the environment within which the vehicle 102 is positioned. In such examples, data from the real sensor source (e.g., sensor(s) 202) can be indistinguishable from data from a simulated sensor source when aggregated into aggregated data.

In additional and/or alternative examples, merge module 210 can merge perception data with simulated perception data. In such examples, the merge module 210 can output a list of objects. In at least one example, the list of objects can be a combination of real objects and simulated objects, however, when output from the merge module 210, real object(s) can be indistinguishable from simulated object(s).

That is, the aggregated data can correspond to a list of objects, which are indistinguishable to the planning module 212 for planning trajectories.

Planning module 212 can be configured to plan trajectories along which the vehicle 102 can drive. In at least one example, the planning module 212 can be configured to determine a most efficient route to travel from a first location (e.g., a current location) to a second location (e.g., a target location). In at least one example, the planning module 212 can generate an instruction for guiding the vehicle 102 along at least a portion of the route from the first location to the second location in view of the one or more objects identified in the environment and/or other information known about the environment (e.g., as determined from sensor data, for example). In at least one example, the planning module 212 can determine how to guide the vehicle 102 from a first waypoint in the sequence of waypoints to a second waypoint in the sequence of waypoints. In some examples, the instruction can be a trajectory, or a portion of a trajectory. In such examples, the planning module 212 can generate a sequence of actions (e.g., drive down the road, accelerate, change lanes, turn left, etc.) to guide the vehicle 102 along the route.

Execution module 214 can be configured to receive a trajectory from the planning module 212 and can compute commands for actuating steering and acceleration of the vehicle 102 to enable the vehicle 102 to follow the output trajectory. In at least one example, the execution module 214 can receive the trajectory and can compute a steering angle and velocity to enable the vehicle 102 to follow the output trajectory.

Evaluation module 216 can be configured to evaluate a performance of the vehicle 102. In at least one example, the evaluation module 216 can analyze data indicating how the vehicle 102 responds to a scenario generated in the environment. In some examples, a human analyst can observe the performance of the vehicle 102 and provide data indicative of the performance to the evaluation module 216 (e.g., via a user interface). In such examples, the human analyst can indicate whether the vehicle 102 performed as expected or did not perform as expected. In some examples, the human analyst can provide a binary indication (pass or fail) associated with the performance of the vehicle 102. In additional and/or alternative examples, the human analyst can provide a rating indicative of the performance of the vehicle 102. For instance, a rating above a threshold can indicate that the vehicle 102 performed as expected and a rating below a threshold can indicate that the vehicle 102 did not perform as expected.

In other examples, the evaluation module 216 can compare data indicative of a performance of the vehicle 102 to data indicative of a nominal performance (e.g., an expected performance) of the vehicle 102. In at least one example, a nominal performance can be determined based on data indicative of previous performances of the vehicle in a same or substantially similar scenario, data indicative of previous performances of other vehicle(s) (e.g., another vehicle, a fleet of vehicles, etc.) in the same or substantially similar scenario, etc. In at least one example, the evaluation module 216 can compare the data indicative of the response of the vehicle 102 with the data indicative of a nominal performance to assess the performance of the vehicle 102. In at least one example, the evaluation module 216 can receive instructions indicating a nominal performance of the vehicle 102 and can compare data indicative of a performance of the vehicle 102 to the instructions indicative of the nominal performance of the vehicle 102 to assess the performance of the vehicle 102.

In some examples, the evaluation module 216 can comprise one or more algorithms that can be used to assess the performance of the vehicle 102. As a non-limiting example, the evaluation module 216 can comprise a set of temporal logic formulae which are evaluated during a run of the vehicle 102. In such an example, each formula can indicate one or more rules of driving (e.g. don't hit other obstacles, don't run stop signs, etc.). The evaluation module 216 can evaluate each formula to determine whether the vehicle properly 102 followed predefined driving rules.

Map(s) 218 can be stored in a database. For the purpose of this discussion, a map 218 can be any number of data structures modeled in two dimensions or three dimensions that are capable of providing information about an environment, such as, but not limited to, topologies (such as intersections), streets, mountain ranges, roads, terrain, and the environment in general.

Figure 3:
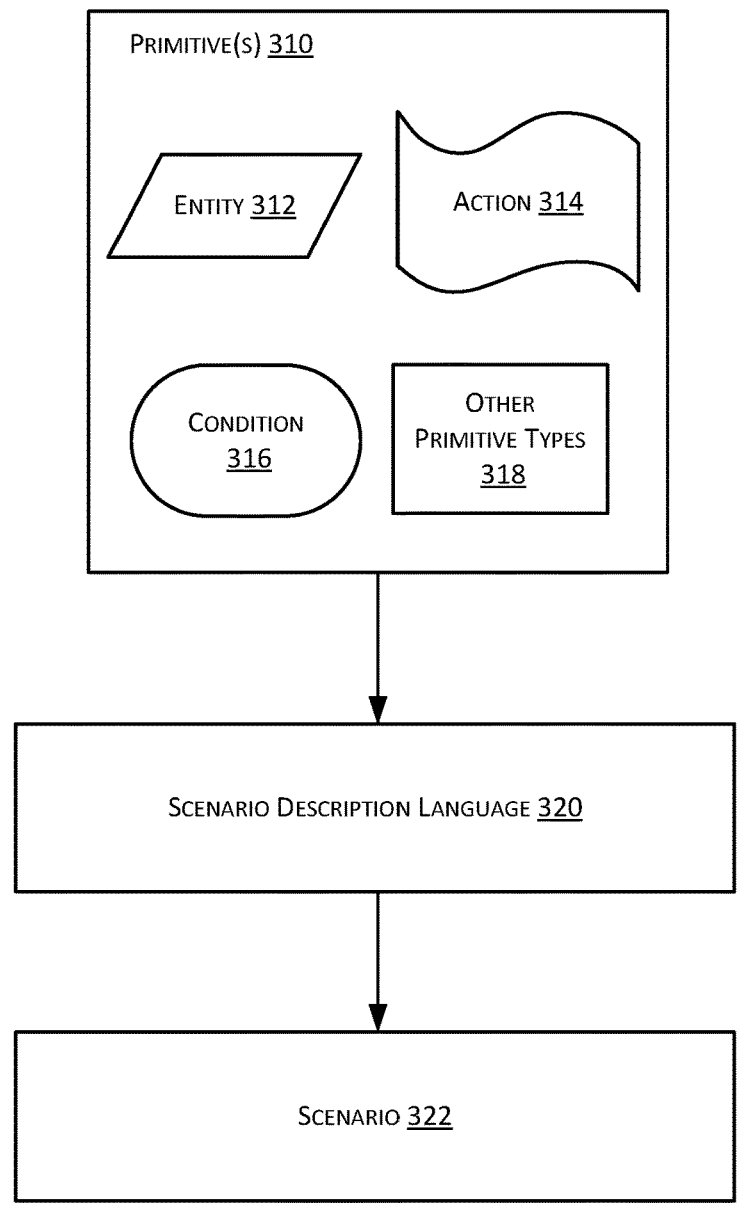
FIG. 3 illustrates an example of a block diagram illustrating how scenarios are defined using the scenario description language.

FIG. 3 illustrates an example of a block diagram 300 illustrating how scenarios are defined using the SDL, in one example. As described above, the SDL allows for easily defining scenarios at a high level to be constructed based on a set of primitives. In at least one example, primitives can be instantiated within an environment, such as within a map (e.g., map(s) 218, described above).

For the purpose of this discussion, a primitive defines a specific aspect of a simulated environment. Non-limiting examples of primitives include coordinate systems, conditions, actions, entities, entity behaviors, noises, faults, etc.

Coordinate systems can be utilized to describe positions and/or speeds (or velocities) of entities in a scenario. Coordinate systems can include inertial coordinate systems, track based coordinate systems, map based coordinate systems, or the like. An inertial coordinate system can be a coordinate system relative to some local or global coordinate system. A track based coordinate system can be a coordinate system relative to some position on a track, such as a segment of a road. A map based coordinate system can utilize semantic coordinates, as described above.

In at least one example, a condition primitive can cause the performance of some action or evaluation of some other condition to be delayed until a condition associated with the condition primitive is satisfied. Condition primitives can include, but are not limited to, a "wait" condition, a "wait for" condition, a "distance between or near" condition, a "speed" condition, an "in region" condition, etc. Additionally and/or alternatively, an "inversion modifier" condition can invert a condition. Conditions can also include Boolean operators, such as, but not limited to, and, or, not, xor, nor, nand, etc, such that multiple conditions as primitives can be combined. It should be noted that the names of the conditions described below are non-limiting, and conditions can be called by same or different names in additional and/or alternative examples.

A "wait" condition can instruct the simulation module 208 to delay the performance of some action or evaluation of some other condition a specified period of time before proceeding. That is, a "wait" condition can be satisfied upon lapse of the period of time. A "wait for" condition can instruct the simulation module 208 not to take any action until another condition is met. That is, a "wait for" condition can be satisfied upon the satisfaction of another condition.

A "distance between or near" condition can instruct the simulation module 208 to delay the performance of some action or evaluation of some other condition until the distance between two entities is below some user specified value. That is, a "distance between or near condition" can be satisfied when a distance between specified entities is determined to be within a threshold distance. In at least one example, when a distance between specified entities is within a threshold distance, a Boolean signaling can be relayed to the simulation module 208 indicating that the distance between two entities is below some user specified value.

A "speed" condition can instruct the simulation module 208 to delay the performance of some action or evaluation of some other condition until a speed (or velocity) of an entity is less than (or greater than) a specified value, or reaches a specified value. That is, a "speed" condition can be satisfied when the speed (or velocity) of an entity is less than (or greater than) a specified value, or reaches a specified value. In at least one example, when the speed (or velocity) of an entity is less than (or greater than) a specified value, or reaches a specified value, a Boolean signaling can be relayed to the simulation module 208 indicating that a speed (or velocity) of an entity is less than (or greater than) a specified value, or reaches a specified value.

An "in region" condition can instruct the simulation module 208 to delay the performance of some action or evaluation of some other condition until an entity is within a specified region. That is, an "in region" condition can be satisfied based on at least a portion of an entity being within a volume of space in a scene (e.g., environment) corresponding to a specified region. In at least one example, based on at least a portion of an entity being within a volume of space in a scene (e.g., environment) corresponding to a specified region, a Boolean signaling can be relayed to the simulation module 208 indicating that an entity is within the specified region.

In at least one example, actions corresponding to action primitives can be performed by the simulation module 208 when they are encountered during instantiation of a sequence. Actions can include turning a trigger on or off. In at least one example, an action can include generating a Log(Display) message for providing the message to a display associated with the simulation module 208 when invoked. Moreover, actions can include creating and/or destroying entities and/or changing entities (e.g., size, shape, type, etc.). In at least one example, an action can include facilitating tele-operation action (i.e., signaling a command from a remote operator).

In at least one example, entity primitives can correspond to entities in a scene. An example of an entity can include a car, a pedestrian, a bike, a building, etc. Each entity can be associated with given dimensions, a type, a pose, etc. Dimensions can correspond to length, width, and height of an entity. A type of an entity can indicate whether the entity is static (not moving) or dynamic (moving). Examples of static entities can include buildings. Examples of dynamic entities can include cars, pedestrians, bikes, etc.

A pose associated with an entity primitive can indicate a location and/or orientation of the corresponding entity in a coordinate system (e.g., inertial coordinate system, track based coordinate system, map based coordinate system, etc.). For instance, a pose of an entity can be described in a two-dimensional inertial coordinate system using a coordinate (x, y) and angular offset (yaw). Similarly, a pose of an entity in a three-dimensional coordinate system can be described by a coordinate (x, y, z), as well as an orientation (roll, pitch, yaw). Or, a pose of an entity can be described in a track based coordinate system with the coordinates (s, t, [yaw_offset]), wherein 's' is an offset along a trajectory of a track, 't' is the offset perpendicular to the trajectory of the track, and yaw_offset is relative to a direction of travel along the track. In a map based coordinate system, a pose can be defined by semantic coordinates. Semantic coordinates can correspond to poses of entities relative to other known poses.

Entity behavior primitives can indicate how an entity behaves in the environment. Entity behavior primitives can include, but are not limited to, a "stop" behavior, a "move" behavior, a "follow road" behavior, a "cross road" behavior, a "follow entity" behavior, etc. A "stop" behavior can indicate to the simulation module 208 to stop moving an entity. A "move" behavior can indicate to the simulation module 208 to move an entity based on inertial coordinates. In some examples, a "move" behavior can be associated with a speed (or velocity). A "follow road" behavior can indicate to the simulation module 208 to continue moving an entity along a road in a map. In some examples, a "follow road" behavior can indicate to the simulation module 208 how to navigate an entity if the entity approaches an intersection (i.e., which branch to take). In some examples, a "follow road" behavior can be associated with a speed (or velocity). A "cross road" behavior can indicate to the simulation module 208 to move an entity laterally across a road in a map. In some examples, the "cross road" behavior can be associated with a speed (or velocity). A "follow entity" behavior can indicate to the simulation module 208 that a first entity should be moved so as to follow a second entity. In at least one example, the "follow entity" behavior can be associated with a speed (or velocity) and an offset value, which is a distance between the first object and the second object.

It should be noted that, in alternative examples, an entity behavior can be mapped to, or otherwise associated with, an entity primitive instead of being its own primitive.

Noises can represent Gaussian noise or other occlusions in an environment. That is, noise primitives can indicate to the simulation module 208 to cause a particular noise to be present in the simulated environment.

Faults can represent failures associated with an entity and/or environment. For instance, as non-limiting examples, a fault can represent a failure of a sensor associated with an entity, a failure of a tire associated with an entity, or a failure of another component associated with an entity. Fault primitives can indicate to the simulation module 208 to cause a respective fault in the simulated environment.

While the aforementioned paragraphs describe non-limiting examples of primitives including coordinate systems, conditions, actions, entities, entity behaviors, noises, faults, etc., it should be noted that additional and/or alternative primitives can be used to generate scenarios as described herein. Furthermore, it should be noted that the names of the primitives described above are non-limiting and primitives can be called by same or different names in additional and/or alternative examples.

As shown in FIG. 3, primitives 310 can include entities 312, actions 314, conditions 316, and any other primitive type 318 (e.g., entity behaviors, noises, faults, etc.). A scenario can be defined at a high level using the scenario description language 320. The scenario description language 320 allows for easily creating scenarios based on the aforementioned primitives 310. The scenario description language 320 allows a user to define specifics about one or more primitives 310. For example, a user can define an entity 312 having a certain dimension, a pose (e.g., using track coordinates, inertial coordinates, or semantic coordinates), as well as specify certain speeds (or velocities) of entities by assigning an entity behavior to the entity 312.

Additionally, the scenario description language 320 allows the user to specify how certain primitives are associated with one another, for example, using a temporal logic (e.g., signal temporal logic, linear temporal logic, etc.). In one example, a user defines an association between primitives by specifying a sequence. A sequence can include multiple steps, which are to be performed in sequential order by the simulation module 208. In at least one example, sequences can be nested within one another such that one step in a sequence is another sequence. As a non-limiting example, a sequence can comprise a "wait for" condition, followed by a "wait" condition, followed by a "follow" behavior.

The scenario description language 320 can create one or more scenarios, such as scenario 322. That is, a scenario 322 can be created using primitives 310, combined in a manner as defined by a user (e.g., a programmer). The manner in which the primitives 310 are combined for a scenario 322 can be defined by temporal logic (e.g., signal temporal logic, linear temporal logic, etc.), as described above.

Additional details associated with scenario description language are described in co-pending, commonly assigned, U.S. patent application Ser. No. 15/405,649, the entirety of which is incorporated herein by reference.

Figure 4:
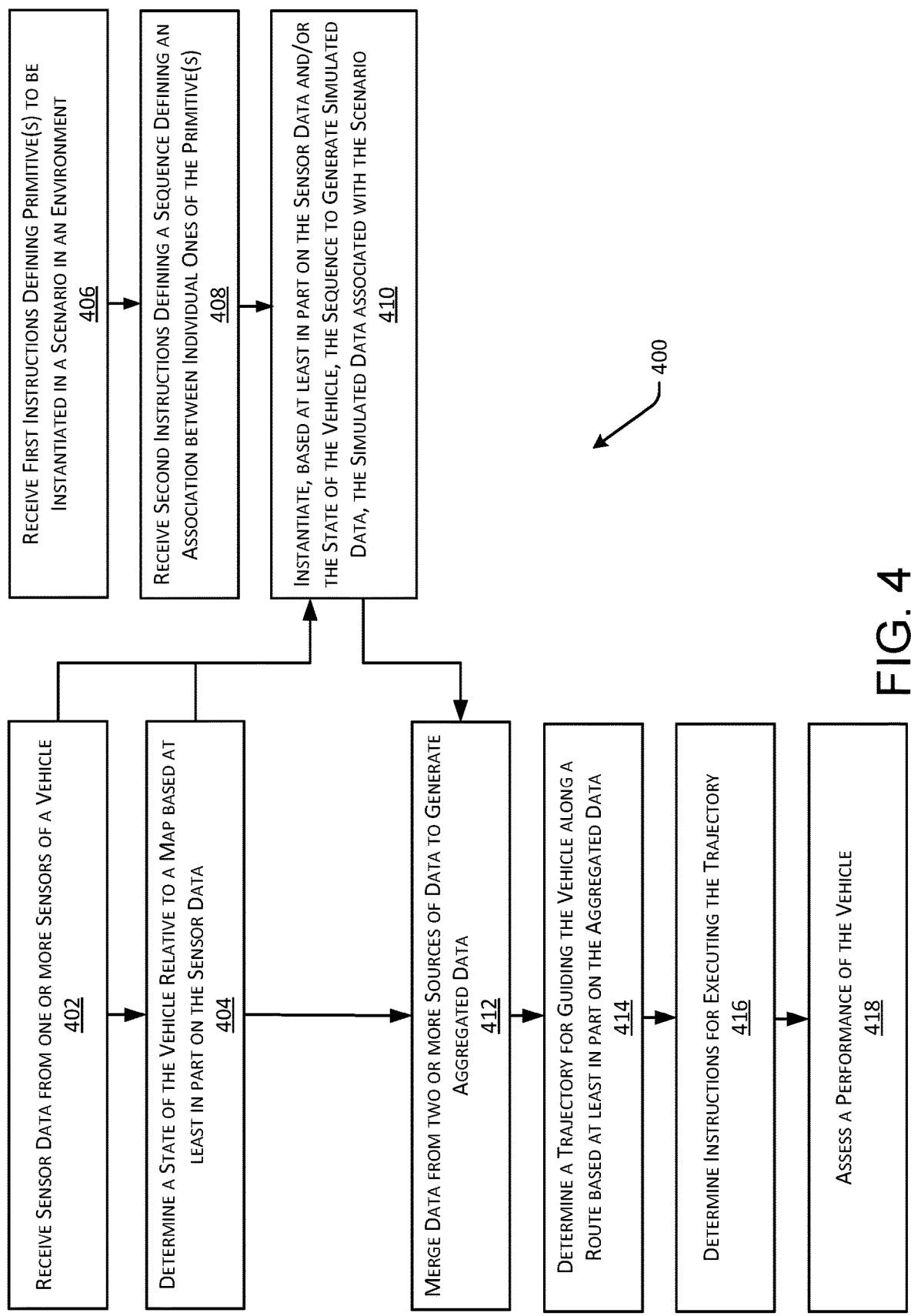
FIG. 4 illustrates an example process for merging data from two sources to generate aggregated data that is used for route planning and performance assessment.
Figure 5:
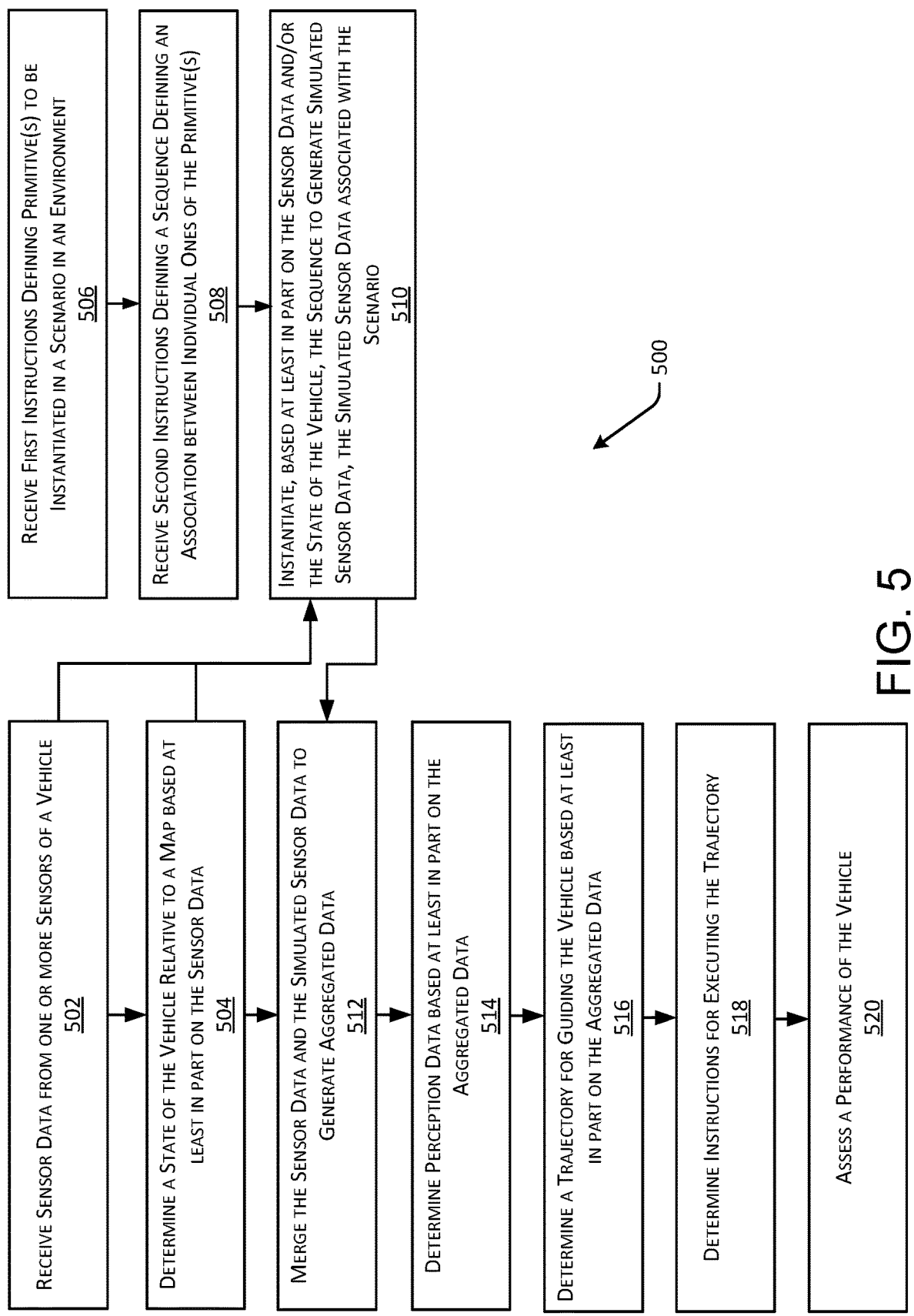
FIG. 5 illustrates an example process for merging sensor data and simulated data to generate aggregated data that is used for route planning and performance assessment.
Figure 6:
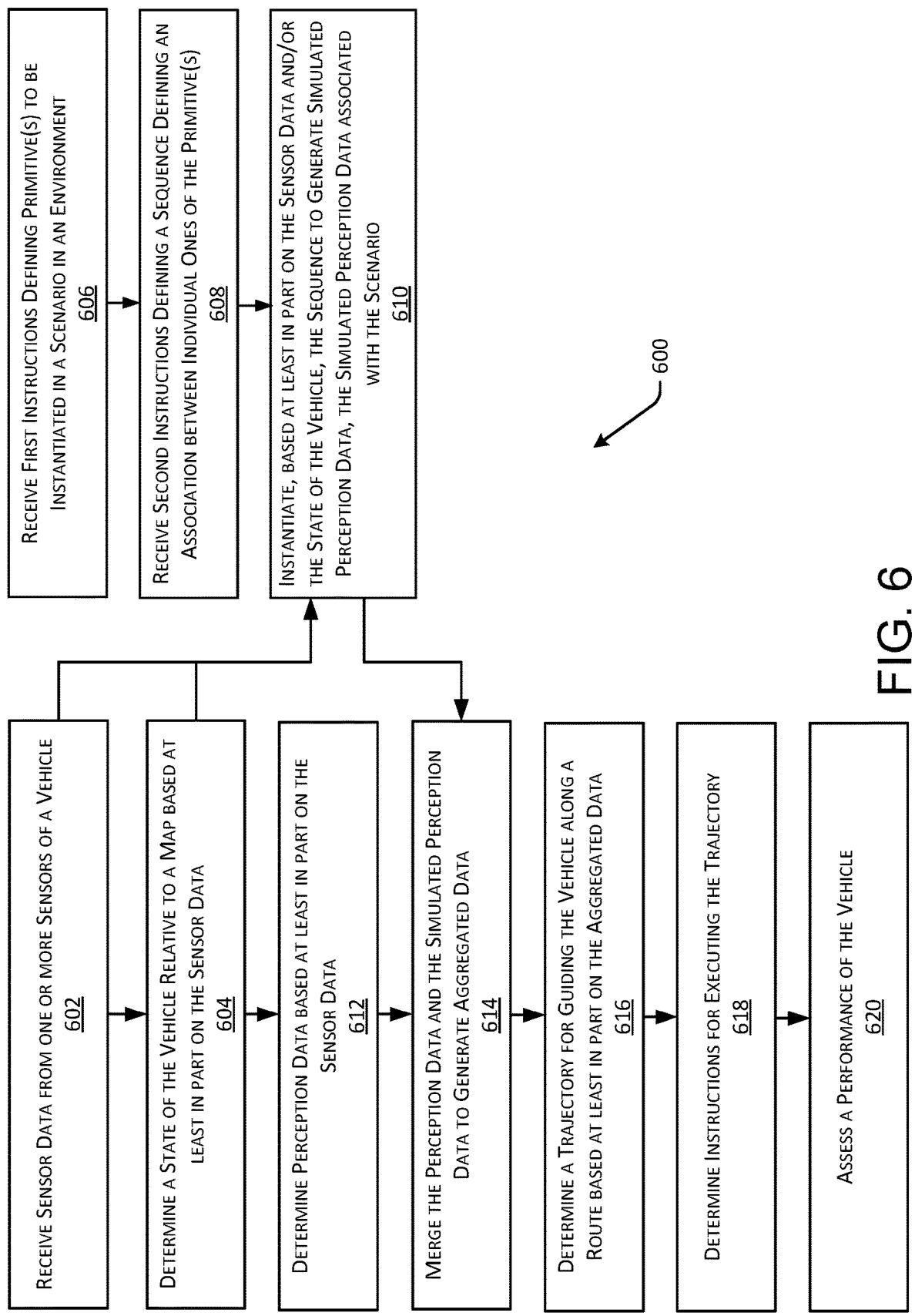
FIG. 6 illustrates an example process for merging perception data and simulated data to generate aggregated data that is used for route planning and performance assessment.

FIGS. 4-6 illustrate example processes in accordance with embodiments of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

FIGS. 4-6 are described below with reference to the environment described above with respect to FIG. 2. However, such processes are not limited to such an environment.

FIG. 4 illustrates an example process 400 for merging data from two or more sources of data to generate augmented data that is used for route planning and performance assessment.

Block 402 illustrates receiving sensor data from one or more sensors of a vehicle. As described above, sensor(s) 202 can include LIDAR sensors for capturing LIDAR data for image segmentation and/or classification, camera sensors for capturing vision data for segmentation and/or classification, RADAR sensors for capturing range, angle, and/or velocity of objects in an environment, SONAR sensors for capturing acoustic information of objects in an environment, etc. Additionally, the sensor(s) 202 can include wheel encoders, microphones, IMUs, accelerometers, gyroscopes, magnetometers, temperature sensors, humidity sensors, light sensors, GPS sensors, etc. Each of the sensor(s) 202 described above can generate sensor data that can be processed by other modules, as described herein.

Block 404 illustrates determining a state of the vehicle relative to a map based at least in part on the sensor data. In at least one example, the localization module 204 can receive at least some of the sensor data. As described above, the localization module 204 can be configured to determine a position of the vehicle 102 in an environment, such as a map. In at least one example, the localization module 204 can access a map (e.g., from map(s) 218, described below) and, based on sensor data received from the sensor(s) 202, the localization module 204 can determine a position and/or orientation of the vehicle 102 relative to the map. In at least one example, the perception module 206 can receive sensor data from one or more of the sensors 202 and can process the sensor data to identify objects and determine information about the objects in the environment. The localization module 204 can process sensor data received from the one or more sensors to determine a state of the vehicle 102 at a particular time. That is, the localization module 204 can process data received from the one or more sensors to determine a position of the vehicle 102 at a particular time, an orientation of the vehicle 102 at a particular time, a velocity of the vehicle 102 at a particular time, etc. In at least one example, the localization module 204 can determine the state of the vehicle 102 in relation to a map.

Block 406 illustrates receiving first instructions defining primitive(s) to be instantiated in a scenario in an environment. As described above, in at least one example, simulation module 208 can be configured to receive instructions to generate a scenario within an environment. In at least one example, the simulation module 208 can receive instructions defining a plurality of primitives. A primitive, as described above, defines a specific aspect of a simulated environment. Non-limiting examples of primitives include coordinate systems, conditions, actions, entities, entity behaviors, noises, faults, etc.

As described above, a scenario can be defined at a high level using SDL. The SDL allows for easily creating scenarios based on one or more primitives. The SDL allows a user to define specifics about one or more primitives. For example, a user can define an entity having a certain dimension, a pose (e.g., using track coordinates, inertial coordinates, or semantic coordinates), as well as specify certain speeds (or velocities) of entities by assigning an entity behavior to the entity. As a non-limiting example, a scenario defined by SDL can define another vehicle (i.e., an entity having a pose) travelling in front of the vehicle 102 at a specified speed (i.e., an entity behavior associated with the entity).

Block 408 illustrates receiving second instructions defining a sequence defining an association between individual ones of the primitive(s). As described above, in at least one example, the simulation module 208 can receive instructions defining a sequence defining an association between individual primitives of the plurality of primitives. In at least one example, the SDL allows the user to specify how certain primitives are associated with one another, for example, using a temporal logic (e.g., signal temporal logic, linear temporal logic, etc.). In one example, a user defines an association between primitives by specifying a sequence. A sequence can include multiple steps, which are to be performed in sequential order. In at least one example, sequences can be nested within one another such that one step in a sequence is another sequence.

Block 410 illustrates instantiating, based at least in part on the sensor data and/or the state of the vehicle, the sequence to generate simulated data, the simulated data associated with the scenario. The simulation module 208 can instantiate the sequence to generate a scenario in an environment. In some examples, the instantiated sequence (i.e., the scenario) can be simulated sensor data. In other examples, the instantiated sequence (i.e., the scenario) can be simulated perception data. In at least one example, the simulation module 208 can leverage at least some of the sensor data and/or outputs of the localization module 204 (e.g., the state of the vehicle) to determine a location and/or timing associated with generating the scenario in the environment. Use of such sensor data and/or outputs of the localization module 204 can be useful for ensuring that simulated objects are presented accurately in the environment (e.g., which ensures that the simulated objects line-up correctly for testing). The simulation module 208 can generate simulated data that indicates one or more simulated objects that are to be instantiated in the environment at a time that the one or more simulated objects are to be instantiated.

Block 412 illustrates merging data from two or more sources of data to generate aggregated data. As described above, merge module 210 can be configured to merge data from different sources to generate aggregated data. In at least one example, one of the sources can be a real data source and another of the sources can be a simulated data source. In at least one example, merge module 210 can be a multiplexer, which can combine data from one or more sources into a single data set. In at least one example, a programmer can provide instructions on how the data from the one or more sources is to be combined. In some examples, data associated with a first data source can override data from a second data source. That is, in some examples, data from a real data source can write over and/or replace data from a simulated data source, or vice versa. In additional and/or alternative examples, data associated with a first data source can be merged with data from a second data source. That is, data from a real data source can be merged with data from a simulated data source. In yet another example, data associated with a first data source can be dropped (e.g., due to being overridden by data associated with a second data source). That is, data from a real data source can be written over and/or replaced with data from a simulated data source, or vice versa. FIGS. 5 and 6 are directed to merging data at different stages of processing to generate aggregated data. For the purpose of FIG. 4, however, merge module 210 can merge the sensor data (or data derived from the sensor data) and the simulated data to generate aggregated data.

Block 414 illustrates determining a trajectory for guiding the vehicle along a route based at least in part on the aggregated data. As described above, planning module 212 can be configured to plan trajectories along which the vehicle 102 can drive. In at least one example, the planning module 212 can be configured to determine a most efficient route to travel from a first location (e.g., a current location) to a second location (e.g., a target location). In at least one example, the planning module 212 can generate an instruction for guiding the vehicle 102 along at least a portion of the route from the first location to the second location in view of the one or more objects identified in the environment and/or other information known about the environment (e.g., as determined from sensor data, for example). In at least one example, the planning module 212 can determine how to guide the vehicle 102 from a first waypoint in the sequence of waypoints to a second waypoint in the sequence of waypoints. In some examples, the instruction can be a trajectory, or a portion of a trajectory. In such examples, the planning module 212 can generate a sequence of actions (e.g., drive down the road, accelerate, change lanes, turn left, etc.) to guide the vehicle 102 along the route.

In some examples, the aggregated data can be processed prior to being provided to the planning module 212. For instance, in an example, the merge module 210 can send the aggregated data to a remote operator to be analyzed. In such an example, the remote operator can filter one or more data items from the aggregated data. Additionally and/or alternatively, the remote operator can modify and/or supplement data items in the aggregated data. Further, in at least one example, the merge module 210 can send the aggregated data to a prediction system, which can extrapolate from the aggregated data to determine where objects in an environment may be over time. In such examples, the processed aggregated data can be provided to the planning module 212 so that the planning module 212 can generate the trajectory.

Block 416 illustrates determining instructions for executing the trajectory. Execution module 214 can be configured to receive a trajectory from the planning module 212 and can compute commands for actuating steering and acceleration of the vehicle 102 to enable the vehicle 102 to follow the output trajectory, as described above. In at least one example, the execution module 214 can receive the trajectory and can compute a steering angle and velocity to enable the vehicle 102 to follow the output trajectory.

Block 418 illustrates assessing a performance of the vehicle. Evaluation module 216 can be configured to evaluate a performance of the vehicle 102. In at least one example, the evaluation module 216 can analyze data indicating how the vehicle 102 responds to a scenario in the environment. As described above, in some examples, a human analyst can observe the performance of the vehicle 102 and provide data indicative of the performance to the evaluation module 216 (e.g., via a user interface). In other examples, the evaluation module 216 can compare data indicative of a performance of the vehicle 102 to data indicative of a nominal performance (e.g., an expected performance) of the vehicle 102. In additional and/or alternative examples, a nominal performance can be determined based on data indicative of previous performances of the vehicle in a same or substantially similar scenario, data indicative of previous performances of other vehicle(s) (e.g., another vehicle, a fleet of vehicles, etc.) in the same or substantially similar scenario, etc. In at least one example, the evaluation module 216 can compare the data indicative of the response of the vehicle 102 with the data indicative of a nominal performance to assess the performance of the vehicle 102. Additionally and/or alternatively, as described above, in some examples, the evaluation module 216 may comprise one or more algorithms that can be used to assess the performance of the vehicle 102.

In at least one example, the evaluation module 216 can determine the performance of various modules and/or systems associated with the vehicle 102. For instance, in at least one example, the evaluation module 216 can evaluate whether the vehicle 102 appropriately called a remote agent for assistance in navigating the scenario. In such an example, the evaluation module 216 can determine whether a call to the remote agent was appropriate and/or whether a timing associated with the call was within a threshold of an expected time for calling the remote agent.

Additionally and/or alternatively, the evaluation module 216 can determine whether a prediction system accurately predicted the behavior of the simulated object(s). In such an example, the evaluation module 216 can compare a prediction associated with a simulated object as determined by a prediction system with the actual behavior associated with the simulated object. The evaluation module 216 can utilize the relationship between the prediction and the actual behavior to assess the performance of the prediction system.

Moreover, in an example, the evaluation module 216 can determine whether the planning module 212 accurately planned a trajectory along which the vehicle 102 is to drive. That is, in at least one example, the evaluation module 216 can compare a trajectory generated by the planning module 212 based on the object(s) identified in the environment and/or the state of the vehicle 102 with an expected trajectory to determine an accuracy associated with the planning module 212.

Furthermore, in at least one example, the evaluation module 216 can determine a performance of low-level control systems (e.g., brakes, steering, accelerator, etc.) based on comparing a performance of a low-level control system with an expected performance of the low-level control system. For instance, the evaluation module 216 can determine whether the vehicle 102 accelerated/decelerated to a predetermined speed within a particular period of time.

In additional and/or alternative examples, the evaluation module 216 can evaluate the overall performance of the vehicle 102. In at least one example, the evaluation module 216 can determine whether the vehicle 102 completed a route within a predetermined period of time. Or, the evaluation module 216 can determine whether the vehicle 102 completed a route without breaking any rules (e.g., of the road, etc.).

Based at least in part on assessing the performance of the vehicle 102, the evaluation module 216 can validate software (i.e., modules) and/or computer system(s) being run on autonomous vehicles to ensure that the software (i.e., modules) and/or computer system(s) is able to safely control such autonomous vehicles. In additional and/or alternative examples, outputs of the evaluation module 216 can be used to learn about the constraints of autonomous vehicles running based on the software (i.e., modules) and/or computer system(s). For instance, outputs of the evaluation module 216 can be used to understand the operational space of an autonomous vehicle (i.e., the envelope of parameters in which the software (i.e., modules) and/or computer system(s) being run on autonomous vehicles effectively controls the autonomous vehicle) in view of surface conditions, ambient noise, faulty components, etc. Further, outputs of the evaluation module 216 can also be useful for generating feedback for improving operations and designs of autonomous vehicles. For instance, in some examples, outputs of the evaluation module 216 can be useful for determining an amount of redundancy that is required in the software (i.e., modules) and/or computer system(s) being run on autonomous vehicles, or how to modify a behavior of the software (i.e., modules) and/or computer system(s) based on what is learned through assessment of the performance of the vehicle 102. Furthermore, in additional and/or alternative examples, outputs of the evaluation module 216 can be useful to inform the hardware design of autonomous vehicles, such as optimizing placement of sensors on an autonomous vehicle.

FIG. 5 illustrates an example process 500 for merging sensor data and simulated data to generate aggregated data that is used for route planning and performance assessment. In at least one example, merging sensor data and simulated data prior to determining perception data can enable the perception module 206 to perceive an environment based on real sensor data and simulated sensor data.

Block 502 illustrates receiving sensor data from one or more sensors of a vehicle, as described above with reference to block 402.

Block 504 illustrates determining a state of the vehicle relative to a map based at least in part on the sensor data, as described above with reference to block 404.

Block 506 illustrates receiving first instructions defining primitive(s) to be instantiated in a scenario in an environment, as described above with reference to block 406.

Block 508 illustrates receiving second instructions defining a sequence defining an association between individual of the primitive(s), as described above with reference to block 408.

Block 510 illustrates instantiating, based at least in part on the sensor data and/or the state of the vehicle, the sequence to generate simulated sensor data, the simulated sensor data associated with the scenario, as described above with reference to block 410.

Block 512 illustrates merging the sensor data and the simulated sensor data to generate aggregated data. As described above, merge module 210 can be configured to merge data from different sources to generate aggregated data. In at least one example, merge module 210 can be a multiplexer, which can combine data from one or more sources into a single data set. In at least one example, the merge module 210 can merge sensor data from sensor(s) 202 with simulated data generated by simulation module 208. In such examples, an output of the merge module 210 can be aggregated data corresponding to information about the environment within which the vehicle 102 is positioned. In such examples, data from a real sensor source (e.g., sensor(s) 202) can be indistinguishable from data from a simulated sensor source when aggregated as aggregated data, to the perception module 206, for instance.

Block 514 illustrates determining perception data based at least in part on the aggregated data. As described above, the perception module 206 can be configured to perform data analysis, such as segmentation and classification, to identify and/or classify objects in the environment and/or determine a position, orientation, size, etc. of the object. In at least one example, the perception module 206 may receive the aggregated data output from the merge module 210 and may identify, classify, and/or determine position, orientation, size, etc. of objects associated with the aggregated data. Furthermore, the perception module 206 can associate objects with a map. In some examples, the perception module 206 can classify objects and associate the objects with a map at substantially the same time. Furthermore, in additional and/or alternative examples, the perception module 206 can track where an identified object has been and/or estimate where the identified object is going. Objects and associations between objects and a map can be associated with perception data. That is, perception data can identify objects in an environment. In at least one example, perception data can be used to determine how the vehicle 102 is moving through its surrounding environment.

Block 516 illustrates determining a trajectory for guiding the vehicle along a route based at least in part on the aggregated data, as described above with reference to block 414. In at least one example, the planning module 212 can plan a trajectory based on the perception data.

As described above, in some examples, the aggregated data can be processed prior to being provided to the planning module 212. For instance, in an example, the merge module 210 can send the aggregated data to a remote operator to be analyzed. In such an example, the remote operator can filter one or more data items from the aggregated data. Additionally and/or alternatively, the remote operator can modify and/or supplement data items in the aggregated data. Further, in at least one example, the merge module 210 can send the aggregated data to a prediction system, which can extrapolate from the aggregated data to determine where objects in an environment may be over time. In such examples, the processed aggregated data can be provided to the planning module 212 so that the planning module 212 can generate the trajectory.

Block 518 illustrates determining instructions for executing the trajectory, as described above with reference to block 416.

Block 520 illustrates assessing a performance of the vehicle, as described above with reference to block 418.

FIG. 6 illustrates an example process 600 for merging perception data and simulated data to generate aggregated data that is used for route planning and performance assessment. In at least one example, merging perception data and simulated data prior to sending the perception data to the planning module 212 can enable the planning module 212 to perceive an environment that includes real objects and/or simulated objects.

Block 602 illustrates receiving sensor data from one or more sensors of a vehicle, as described above with reference to block 402.

Block 604 illustrates determining a state of the vehicle relative to a map based at least in part on the sensor data, as described above with reference to block 404.

Block 606 illustrates receiving first instructions defining primitive(s) to be instantiated in a scenario in an environment, as described above with reference to block 406.

Block 608 illustrates receiving second instructions defining a sequence defining an association between individual of the primitive(s), as described above with reference to block 408.

Block 610 illustrates instantiating, based at least in part on the sensor data and/or the state of the vehicle, the sequence to generate simulated perception data, the simulated perception data associated with the scenario, as described above with reference to block 410. In at least one example, the simulated perception data can define simulated object(s) in the environment.

Block 612 illustrates determining perception data based at least in part on the sensor data. As described above, the perception module 206 can be configured to perform data analysis, such as segmentation and classification, to identify and/or classify objects in the environment and/or determine a position, orientation, size, etc. of the object. In at least one example, the perception module 206 can associate objects with a map. In some examples, the perception module 206 can classify objects and associate the objects with a map at substantially the same time. Furthermore, in additional and/or alternative examples, the perception module 206 can track where an identified object has been and/or estimate where the identified object is going. Objects and associations between objects and a map can be associated with perception data. That is, perception data can identify objects in an environment. In at least one example, perception data can be used to determine how the vehicle 102 is moving through its surrounding environment.

Block 614 illustrates merging the perception data and the simulated perception data to generate aggregated data. As described above, merge module 210 can be configured to merge data from different sources to generate aggregated data. In at least one example, the merge module 210 can merge perception data with simulated perception data. In such examples, the merge module 210 can output a list of objects. In at least one example, the list of objects can be a combination of real objects and simulated objects, however, when output from the merge module 210, real object(s) can be indistinguishable from simulated object(s) to the planning module 212, for instance. That is, the aggregated data can correspond to a list of objects.

Block 616 illustrates determining a trajectory for guiding the vehicle along a route based at least in part on the aggregated data, as described above with reference to block 414. In at least one example, the planning module 212 can leverage the list of objects to determine a trajectory along which the vehicle 102 can drive.

As described above, in some examples, the aggregated data can be processed prior to being provided to the planning module 212. For instance, in an example, the merge module 210 can send the aggregated data to a remote operator to be analyzed. In such an example, the remote operator can filter one or more data items from the aggregated data. Additionally and/or alternatively, the remote operator can modify and/or supplement data items in the aggregated data. Further, in at least one example, the merge module 210 can send the aggregated data to a prediction system, which can extrapolate from the aggregated data where objects in an environment may be over time. In such examples, the processed aggregated data can be provided to the planning module 212 so that the planning module 212 can generate the trajectory.

Block 618 illustrates determining instructions for executing the trajectory, as described above with reference to block 416.

Block 620 illustrates assessing a performance of the vehicle, as described above with reference to block 418.

Figure 7:
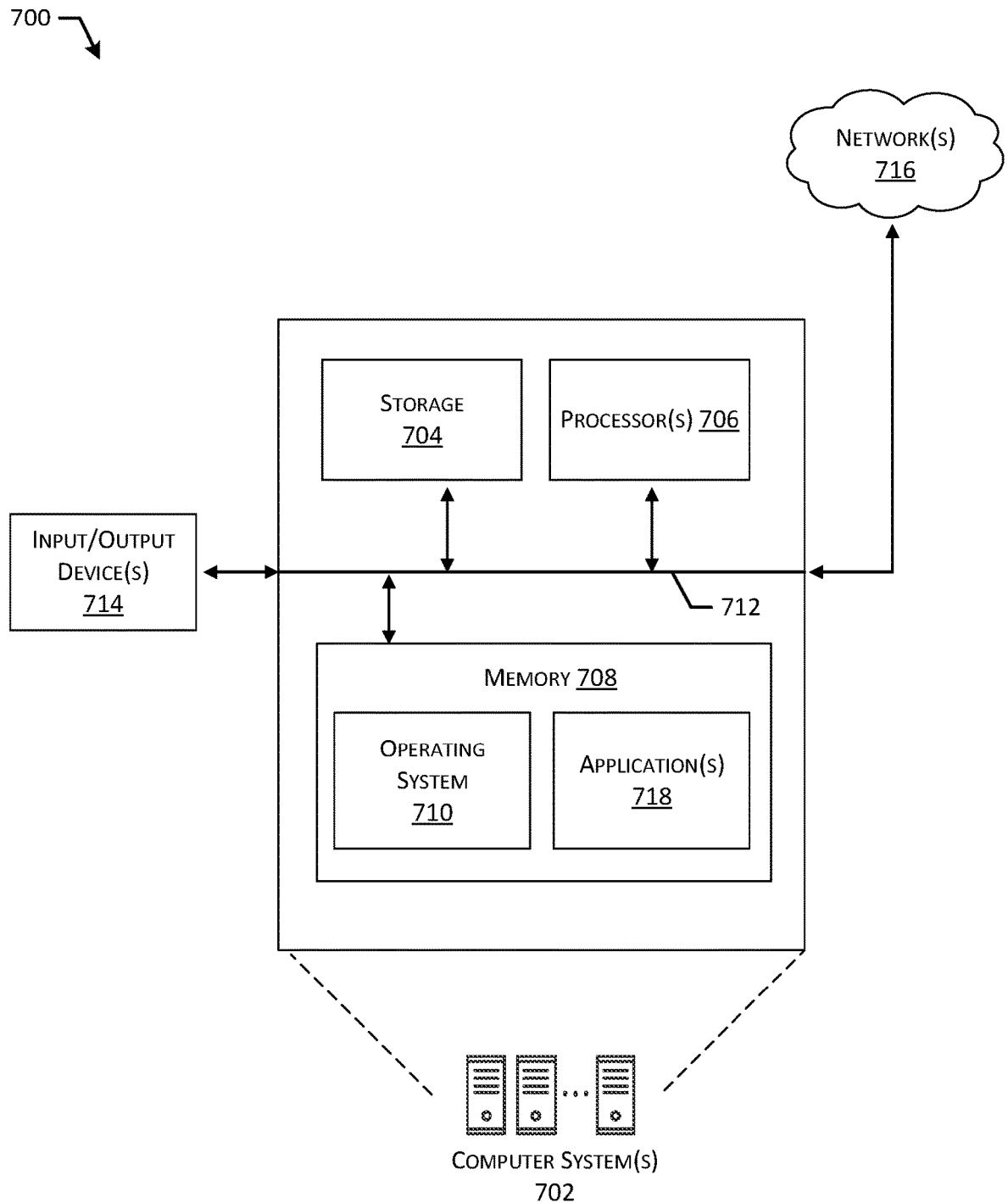
FIG. 7 illustrates an example computer system which can be used to define scenarios using the scenario description language and/or simulate scenarios defined using the scenario description language.

FIG. 7 illustrates an environment 700 in which the disclosures can be implemented in whole or in part. The environment 700 depicts one or more computer systems 702 that comprise a storage 704, one or more processor(s) 706, a memory 708, and an operating system 710. The storage 704, the processor(s) 706, the memory 708, and the operating system 710 can be communicatively coupled over a communication infrastructure 712. Optionally, the computer system 702 can interact with a user, or environment, via input/output (I/O) device(s) 714, as well as one or more other computing devices over a network 716, via the communication infrastructure 712. The operating system 710 can interact with other components to control one or more applications 718.

In some examples, the computer system(s) 702 can correspond to the computer system(s) 200 of FIG. 2. Further, the computer system(s) 702 can implement any hardware and/or software to implement the modules 204, 206, 208, 210, 212, 214, 216 and/or map(s) 218, as discussed herein. As described above, in at least one example, at least a portion of computer system(s) 702 can be running on a vehicle, such as an autonomous vehicle.

The systems and methods described herein can be implemented in software or hardware or any combination thereof. The systems and methods described herein can be implemented using one or more computing devices which may or may not be physically or logically separate from each other. The methods can be performed by components arranged as either on-premise hardware, on-premise virtual systems, or hosted-private examples. Additionally, various aspects of the methods described herein can be combined or merged into other functions.

An exemplary environment and computerized system for implementing the systems and methods described herein is illustrated in FIG. 7. A processor or computer system can be configured to particularly perform some or all of the methods described herein. In some embodiments, the methods can be partially or fully automated by one or more computers or processors. The systems and methods described herein can be implemented using a combination of any of hardware, firmware, and/or software. The present systems and methods described herein (or any part(s) or function(s) thereof) can be implemented using hardware, software, firmware, or a combination thereof and can be implemented in one or more computer systems or other processing systems. In some embodiments, the illustrated system elements could be combined into a single hardware device or separated into multiple hardware devices. If multiple hardware devices are used, the hardware devices could be physically located proximate to or remotely from each other. The embodiments of the methods described and illustrated are intended to be illustrative and not to be limiting. For example, some or all of the steps of the methods can be combined, rearranged, and/or omitted in different embodiments.

In one exemplary embodiment, the systems and methods described herein can be directed toward one or more computer systems capable of carrying out the functionality described herein. Example computing devices can be, but are not limited to, a personal computer (PC) system running any operating system such as, but not limited to, OS X™, iOS™, Linux™, Android™ and Microsoft™ Windows™. However, the systems and methods described herein can not be limited to these platforms. Instead, the systems and methods described herein can be implemented on any appropriate computer system running any appropriate operating system. Other components of the systems and methods described herein, such as, but not limited to, a computing device, a communications device, mobile phone, a smartphone, a telephony device, a telephone, a personal digital assistant (PDA), a personal computer (PC), a handheld PC, an interactive television (iTV), a digital video recorder (DVD), client workstations, thin clients, thick clients, proxy servers, network communication servers, remote access devices, client computers, server computers, routers, web servers, data, media, audio, video, telephony or streaming technology servers, etc., can also be implemented using a computing device. Services can be provided on demand using, e.g., but not limited to, an interactive television (iTV), a video on demand system (VOD), and via a digital video recorder (DVR), or other on demand viewing system.

The system can include one or more processors. The processor(s) can be connected to a communication infrastructure, such as but not limited to, a communications bus, cross-over bar, or network, etc. The processes and processors need not be located at the same physical locations. In other words, processes can be executed at one or more geographically distant processors, over for example, a LAN or WAN connection. Computing devices can include a display interface that can forward graphics, text, and other data from the communication infrastructure for display on a display unit.

The computer system can also include, but is not limited to, a main memory, random access memory (RAM), and a secondary memory, etc. The secondary memory can include, for example, a hard disk drive and/or a removable storage drive, such as a compact disc drive CD-ROM, etc. The removable storage drive can read from and/or written to a removable storage unit. As can be appreciated, the removable storage unit can include a computer usable storage medium having stored therein computer software and/or data. In some embodiments, a machine-accessible medium can refer to any storage device used for storing data accessible by a computer. Examples of a machine-accessible medium can include, e.g., but not limited to: a magnetic hard disk; a floppy disk; an optical disk, like a compact disc read-only memory (CD-ROM) or a digital versatile disc (DVD); a magnetic tape; and/or a memory chip, etc.

The processor can also include, or be operatively coupled to communicate with, one or more data storage devices for storing data. Such data storage devices can include, as non-limiting examples, magnetic disks (including internal hard disks and removable disks), magneto-optical disks, optical disks, read-only memory, random access memory, and/or flash storage. Storage devices suitable for tangibly embodying computer program instructions and data can also include all forms of non-volatile memory, including, for example, semiconductor memory devices, such as EPROM, EEPROM, and flash memory devices; magnetic disks such as internal hard disks and removable disks; magneto-optical disks; and CD-ROM and DVD-ROM discs. The processor and the memory can be supplemented by, or incorporated in, ASICs (application-specific integrated circuits).

The processing system can be in communication with a computerized data storage system. The data storage system can include a non-relational or relational data store, such as a MySQL™ or other relational database. Other physical and logical database types could be used. The data store can be a database server, such as Microsoft SQL Server™, Oracle™, IBM DB2™, SQLITE™, or any other database software, relational or otherwise. The data store can store the information identifying syntactical tags and any information required to operate on syntactical tags. In some embodiments, the processing system can use object-oriented programming and can store data in objects. In these embodiments, the processing system can use an object-relational mapper (ORM) to store the data objects in a relational database. The systems and methods described herein can be implemented using any number of physical data models. In one example embodiment, a relational database management system (RDBMS) can be used. In those embodiments, tables in the RDBMS can include columns that represent coordinates. In the case of economic systems, data representing companies, products, etc., can be stored in tables in the RDBMS. The tables can have pre-defined relationships between them. The tables can also have adjuncts associated with the coordinates.

In alternative exemplary embodiments, secondary memory can include other similar devices for allowing computer programs or other instructions to be loaded into a computer system. Such devices can include, for example, a removable storage unit and an interface. Examples of such can include a program cartridge and cartridge interface (such as, e.g., but not limited to, those found in video game devices), a removable memory chip (such as, e.g., but not limited to, an erasable programmable read only memory (EPROM), or programmable read only memory (PROM) and associated socket), and other removable storage units and interfaces, which can allow software and data to be transferred from the removable storage unit to computer system.

The computing device can also include an input device such as, but not limited to, a voice input device, such as a microphone, touch screens, gesture recognition devices, such as cameras, other natural user interfaces, a mouse or other pointing device such as a digitizer, and a keyboard or other data entry device. The computing device can also include output devices, such as but not limited to, a display, and a display interface. The computing device can include input/output (I/O) devices such as but not limited to a communications interface, cable and communications path, etc. These devices can include, but are not limited to, a network interface card, and modems. Communications interface(s) can allow software and data to be transferred between a computer system and one or more external devices.

In one or more embodiments, the computing device can be operatively coupled to an automotive system. Such automotive system can be either manually operated, semi-autonomous, or fully autonomous. In such an embodiment, input and output devices can include one or more image capture devices, controllers, microcontrollers, and/or other processors to control automotive functions such as, but not limited to, acceleration, braking, and steering. Further, communication infrastructure in such embodiments can also include a Controller Area Network (CAN) bus.

In one or more embodiments, the computing device can be operatively coupled to any machine vision based system. For example, such machine based vision systems include but are not limited to manually operated, semi-autonomous, or fully autonomous industrial or agricultural robots, household robot, inspection system, security system, etc. That is, the embodiments described herein are not limited to one particular context and can be applicable to any application utilizing machine vision.

In one or more embodiments, the present embodiments can be practiced in the environment of a computer network or networks. The network can include a private network, or a public network (for example the Internet, as described below), or a combination of both. The network can include hardware, software, or a combination of both.

From a telecommunications-oriented view, the network can be described as a set of hardware nodes interconnected by a communications facility, with one or more processes (hardware, software, or a combination thereof) functioning at each such node. The processes can inter-communicate and exchange information with one another via communication pathways between them using interprocess communication pathways. On these pathways, appropriate communications protocols are used.

An exemplary computer and/or telecommunications network environment in accordance with the present embodiments can include nodes, which can include hardware, software, or a combination of hardware and software. The nodes can be interconnected via a communications network. Each node can include one or more processes, executable by processors incorporated into the nodes. A single process can be run by multiple processors, or multiple processes can be run by a single processor, for example. Additionally, each of the nodes can provide an interface point between network and the outside world, and can incorporate a collection of sub-networks.

In an exemplary embodiment, the processes can communicate with one another through interprocess communication pathways supporting communication through any communications protocol. The pathways can function in sequence or in parallel, continuously or intermittently. The pathways can use any of the communications standards, protocols or technologies, described herein with respect to a communications network, in addition to standard parallel instruction sets used by many computers.

The nodes can include any entities capable of performing processing functions. Examples of such nodes that can be used with the embodiments include computers (such as personal computers, workstations, servers, or mainframes), handheld wireless devices and wireline devices (such as personal digital assistants (PDAs), modem cell phones with processing capability, wireless email devices including BlackBerry™ devices), document processing devices (such as scanners, printers, facsimile machines, or multifunction document machines), or complex entities (such as local-area networks or wide area networks) to which are connected a collection of processors, as described. For example, in the context of the present disclosure, a node itself can be a wide-area network (WAN), a local-area network (LAN), a private network (such as a Virtual Private Network (VPN)), or collection of networks.

Communications between the nodes can be made possible by a communications network. A node can be connected either continuously or intermittently with communications network. As an example, in the context of the present disclosure, a communications network can be a digital communications infrastructure providing adequate bandwidth and information security.

The communications network can include wireline communications capability, wireless communications capability, or a combination of both, at any frequencies, using any type of standard, protocol or technology. In addition, in the present embodiments, the communications network can be a private network (for example, a VPN) or a public network (for example, the Internet).

A non-inclusive list of exemplary wireless protocols and technologies used by a communications network can include Bluetooth™, general packet radio service (GPRS), cellular digital packet data (CDPD), mobile solutions platform (MSP), multimedia messaging (MMS), wireless application protocol (WAP), code division multiple access (CDMA), short message service (SMS), wireless markup language (WML), handheld device markup language (HDML), binary runtime environment for wireless (BREW), radio access network (RAN), and packet switched core networks (PS-CN). Also included are various generation wireless technologies. An exemplary non-inclusive list of primarily wireline protocols and technologies used by a communications network includes asynchronous transfer mode (ATM), enhanced interior gateway routing protocol (EIGRP), frame relay (FR), high-level data link control (HDLC), Internet control message protocol (ICMP), interior gateway routing protocol (IGRP), internetwork packet exchange (IPX), ISDN, point-to-point protocol (PPP), transmission control protocol/internet protocol (TCP/IP), routing information protocol (RIP) and user datagram protocol (UDP). As skilled persons will recognize, any other known or anticipated wireless or wireline protocols and technologies can be used.

Embodiments of the present disclosure can include apparatuses for performing the operations herein. An apparatus can be specially constructed for the desired purposes, or it can comprise a general purpose device selectively activated or reconfigured by a program stored in the device.

In one or more embodiments, the present embodiments are embodied in machine-executable instructions. The instructions can be used to cause a processing device, for example a general-purpose or special-purpose processor, which is programmed with the instructions, to perform the steps of the present disclosure. Alternatively, the steps of the present disclosure can be performed by specific hardware components that contain hardwired logic for performing the steps, or by any combination of programmed computer components and custom hardware components. For example, the present disclosure can be provided as a computer program product, as outlined above. In this environment, the embodiments can include a machine-readable medium having instructions stored on it. The instructions can be used to program any processor or processors (or other electronic devices) to perform a process or method according to the present exemplary embodiments. In addition, the present disclosure can also be downloaded and stored on a computer program product. Here, the program can be transferred from a remote computer (e.g., a server) to a requesting computer (e.g., a client) by way of data signals embodied in a carrier wave or other propagation medium via a communication link (e.g., a modem or network connection) and ultimately such signals can be stored on the computer systems for subsequent execution.

The methods can be implemented in a computer program product accessible from a computer-usable or computer-readable storage medium that provides program code for use by or in connection with a computer or any instruction execution system. A computer-usable or computer-readable storage medium can be any apparatus that can contain or store the program for use by or in connection with the computer or instruction execution system, apparatus, or device.

A data processing system suitable for storing and/or executing the corresponding program code can include at least one processor coupled directly or indirectly to computerized data storage devices such as memory elements. Input/output (I/O) devices (including but not limited to keyboards, displays, pointing devices, etc.) can be coupled to the system. Network adapters can also be coupled to the system to enable the data processing system to become coupled to other data processing systems or remote printers or storage devices through intervening private or public networks. To provide for interaction with a user, the features can be implemented on a computer with a display device, such as an LCD (liquid crystal display), or another type of monitor for displaying information to the user, and a keyboard and an input device, such as a mouse or trackball by which the user can provide input to the computer.

A computer program can be a set of instructions that can be used, directly or indirectly, in a computer. The systems and methods described herein can be implemented using programming languages such as CUDA, OpenCL, Flash™, JAVA™, C++, C, C #, Python, Visual Basic™ JavaScript™ PHP, XML, HTML, etc., or a combination of programming languages, including compiled or interpreted languages, and can be deployed in any form, including as a stand-alone program or as a module, component, subroutine, or other unit suitable for use in a computing environment. The software can include, but is not limited to, firmware, resident software, microcode, etc. Protocols such as SOAP/HTTP can be used in implementing interfaces between programming modules. The components and functionality described herein can be implemented on any desktop operating system executing in a virtualized or non-virtualized environment, using any programming language suitable for software development, including, but not limited to, different versions of Microsoft Windows™, Apple™ Mac™, iOS™, Unix™/X-Windows™, Linux™, etc. The system could be implemented using a web application framework, such as Ruby on Rails.

Suitable processors for the execution of a program of instructions include, but are not limited to, general and special purpose microprocessors, and the sole processor or one of multiple processors or cores, of any kind of computer. A processor can receive and store instructions and data from a computerized data storage device such as a read-only memory, a random access memory, both, or any combination of the data storage devices described herein. A processor can include any processing circuitry or control circuitry operative to control the operations and performance of an electronic device.

The systems, modules, and methods described herein can be implemented using any combination of software or hardware elements. The systems, modules, and methods described herein can be implemented using one or more virtual machines operating alone or in combination with one other. Any applicable virtualization solution can be used for encapsulating a physical computing machine platform into a virtual machine that is executed under the control of virtualization software running on a hardware computing platform or host. The virtual machine can have both virtual system hardware and guest operating system software.

The systems and methods described herein can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks that form the Internet.

One or more embodiments of the present disclosure can be practiced with other computer system configurations, including hand-held devices, microprocessor systems, microprocessor-based or programmable consumer electronics, minicomputers, mainframe computers, etc. The systems and methods described herein can also be practiced in distributed computing environments where tasks are performed by remote processing devices that are linked through a network.

The terms "computer program medium" and "computer readable medium" can be used to generally refer to media such as but not limited to removable storage drive, a hard disk installed in hard disk drive. These computer program products can provide software to computer system. The systems and methods described herein can be directed to such computer program products.

References to "one embodiment," "an embodiment," "example embodiment," "various embodiments," etc., can indicate that the embodiment(s) of the present disclosure can include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they can. Similarly, references to "examples" can indicate that various example(s) of the present disclosure can include a particular feature, structure, or characteristic, but not every example necessarily includes the particular feature, structure, or characteristic. Further, repeated use of the phrase "in some examples" does not necessarily refer to the same example, although it can.

In the description and claims, the terms "coupled" and "connected," along with their derivatives, can be used. It should be understood that these terms can be not intended as synonyms for each other. Rather, in particular embodiments, "connected" can be used to indicate that two or more elements are in direct physical or electrical contact with each other. "Coupled" can mean that two or more elements are in direct physical or electrical contact. However, "coupled" can also mean that two or more elements are not in direct contact with each other, but yet still co-operate or interact with each other.

An algorithm can be here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, it can be appreciated that throughout the specification terms such as "processing," "computing," "calculating," "determining," or the like, refer to the action and/or processes of a computer or computer system, or similar electronic computing device, that manipulate and/or transform data represented as physical, such as electronic, quantities within the computer system's registers and/or memories into other data similarly represented as physical quantities within the computer system's memories, registers or other such information storage, transmission or display devices.

In a similar manner, the term "processor" can refer to any device or portion of a device that processes electronic data from registers and/or memory to transform that electronic data into other electronic data that can be stored in registers and/or memory. As non-limiting examples, "processor" can be a Central Processing Unit (CPU) or a Graphics Processing Unit (GPU). A "computing platform" can comprise one or more processors. As used herein, "software" processes can include, for example, software and/or hardware entities that perform work over time, such as tasks, threads, and intelligent agents. Also, each process can refer to multiple processes, for carrying out instructions in sequence or in parallel, continuously or intermittently. The terms "system" and "method" are used herein interchangeably insofar as the system can embody one or more methods and the methods can be considered as a system.

While one or more embodiments have been described, various alterations, additions, permutations and equivalents thereof are included within the scope of the disclosure.

In the description of embodiments, reference is made to the accompanying drawings that form a part hereof, which show by way of illustration specific embodiments of the claimed subject matter. It is to be understood that other embodiments can be used and that changes or alterations, such as structural changes, can be made. Such embodiments, changes or alterations are not necessarily departures from the scope with respect to the intended claimed subject matter. While the steps herein can be presented in a certain order, in some implementations the ordering can be changed so that certain inputs are provided at different times or in a different order without changing the function of the systems and methods described. The disclosed procedures could also be executed in different orders. Additionally, various computations that are herein need not be performed in the order disclosed, and other embodiments using alternative orderings of the computations could be readily implemented. In addition to being reordered, the computations could also be decomposed into sub-computations with the same results.

Although the discussion above sets forth example implementations of the described techniques, other architectures can be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

EXAMPLE CLAUSES

A. A system associated with a vehicle, the system comprising: one or more processors; and one or more non-transitory computer-readable media storing instructions executable by the one or more processors, wherein the instructions program the one or more processors to perform actions comprising: receiving, from one or more sensors, sensor data associated with an environment within which the vehicle is positioned; determining, based at least in part on the sensor data, a state of the vehicle in the environment; receiving instructions defining one or more simulated objects that are to be instantiated as a scenario in the environment, the one or more simulated objects instantiated based on the state of the vehicle; and determining a trajectory along which the vehicle is to drive based at least in part on the one or more simulated objects.

B. A system as paragraph A recites, wherein the actions further comprise: receiving instructions defining a plurality of primitives, at least one primitive of the plurality of primitives corresponding to a simulated object of the one or more simulated objects; receiving a sequence defining an association between individual primitives of the plurality of primitives; and instantiating the plurality of primitives, based at least in part on the sensor data, to generate the scenario.

C. A system as paragraph B recites, wherein the sequence is defined using temporal logic.

D. A system as any of paragraphs A-C recite, wherein the actions further comprise determining, based at least in part on execution of the trajectory, information associated with the scenario, the information describing how the vehicle responds given the scenario created in the environment.

E. A system as paragraph D recites, wherein determining the information associated with the scenario comprises validating that the vehicle performed in accordance with a set of rules.

F. A system as paragraph D recites, wherein determining the information associated with the scenario comprises at least one of: determining an operational space of the vehicle given the scenario; or generating feedback for improving at least one of operations or designs of the vehicle.

G. A system as any of paragraphs A-F recite, wherein the vehicle is an autonomous vehicle.

H. A system as any of paragraphs A-G recite, wherein the instructions further comprise: determining, based at least in part on the sensor data, one or more real objects in the environment; and merging the one or more simulated objects and one or more real objects into a group of objects, wherein the one or more simulated objects are indistinguishable from the one or more real objects for determining the trajectory.

I. A computer-implemented method comprising: generating a simulated scenario associated with one or more primitives, the simulated scenario being associated with simulated data; receiving sensor data from one or more sensors associated with an vehicle in an environment; determining perception data based at least in part on the sensor data; merging the simulated data and the perception data to generate aggregated data; and determining a trajectory along which the vehicle is to drive based on the aggregated data.

J. A computer-implemented method as paragraph I recites, further comprising instantiating the simulated scenario based at least in part on the perception data.

K. A computer-implemented method as paragraph I or J recites, wherein the one or more sensors include any of a LIDAR sensor, a camera sensor, a RADAR sensor, or a SONAR sensor.

L. A computer-implemented method as any of paragraphs I-K recite, wherein the vehicle is an autonomous vehicle, and the computer-implemented method further comprises generating one or more signals for causing the vehicle to drive along the trajectory.

M. A computer-implemented method as any of paragraphs I-L recite, further comprising evaluating a performance of the vehicle based at least in part on a nominal performance of the vehicle.

N. A computer-implemented method as any of paragraphs I-M recite, further comprising evaluating a performance of the vehicle based at least in part on one or more formulae indicating a set of driving rules.

O. A non-transitory computer-readable medium having a set of instructions that, when executed, cause one or more processors to perform operations comprising: receiving, from one or more sensors, sensor data associated with an environment within which an vehicle is positioned; receiving instructions defining simulated data associated with one or more primitives that are to be instantiated in the environment; merging the sensor data and the simulated data to generate aggregated data; and determining a trajectory along which the vehicle is to drive based at least in part on the aggregated data.

P. A non-transitory computer-readable medium as paragraph O recites, the operations further comprising: determining one or more objects in the environment based at least in part on merging the sensor data and the simulated data; and determining the trajectory based at least in part on the one or more objects.

Q. A non-transitory computer-readable medium as paragraph O or P recites, the operations further comprising: determining, based at least in part on the sensor data, one or more real objects in the environment; and determining, based at least in part on the simulated data, one or more simulated objects in the environment, wherein merging the sensor data and the simulated data comprises merging the one or more real objects and the one or more simulated objects into a group of objects.

R. A non-transitory computer-readable medium as paragraph Q recites, wherein the one or more real objects are indistinguishable from the one or more simulated objects for determining the trajectory.

S. A non-transitory computer-readable medium as any of paragraphs O-R recite, wherein the simulated data further comprises a sequence defining an association between individual primitives of the one or more primitives.

T. A non-transitory computer-readable medium as any of paragraphs O-S recite, the operations further comprising: determining one or more commands to cause the vehicle to drive along the trajectory; executing the one or more commands; and assessing a performance of the vehicle based at least in part on executing the one or more commands.

While paragraphs A-H are described above with respect to a system, it is understood in the context of this document that the content of paragraphs A-H may also be implemented via a method, device, and/or computer storage media. While paragraphs I-N are described above with respect to a method, it is understood in the context of this document that the content of paragraphs I-N may also be implemented via a system, device, and/or computer storage media. While paragraphs O-T are described above with respect to a non-transitory computer-readable medium, it is understood in the context of this document that the content of paragraphs O-T may also be implemented via a method, device, and/or system.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What we claim is:

1. A system associated with a vehicle, the system comprising:
   one or more processors; and
   one or more non-transitory computer-readable media storing instructions executable by the one or more processors, wherein the instructions program the one or more processors to perform actions comprising:
      while the vehicle is operating in an environment in which the vehicle is positioned:
         receiving, from one or more sensors, sensor data associated with the environment within which the vehicle is positioned;
         determining, based at least in part on the sensor data, a state of the vehicle in the environment;
         receiving instructions defining one or more simulated objects that are to be instantiated as a scenario in the environment in which the vehicle is positioned, the one or more simulated objects instantiated based on the state of the vehicle and independent of the sensor data; and
         determining, by considering the one or more simulated objects as real objects in the environment, a trajectory along which the vehicle is to drive in the environment.

2. The system as claim 1 recites, wherein the actions further comprise:
   receiving instructions defining a plurality of primitives, at least one primitive of the plurality of primitives corresponding to a simulated object of the one or more simulated objects;
   receiving a sequence defining an association between individual primitives of the plurality of primitives; and
   instantiating the plurality of primitives, based at least in part on the sensor data, to generate the scenario.

3. The system as claim 2 recites, wherein the sequence is defined using temporal logic.

4. The system as claim 1 recites, wherein the actions further comprise determining, based at least in part on execution of the trajectory, information associated with the scenario, the information describing how the vehicle responds given the scenario created in the environment.

5. The system as claim 4 recites, wherein determining the information associated with the scenario comprises validating that the vehicle performed in accordance with a set of rules.

6. The system as claim 4 recites, wherein determining the information associated with the scenario comprises at least one of:
   determining an operational space of the vehicle given the scenario; or
   generating feedback for improving at least one of operations or designs of the vehicle.

7. The system as claim 1 recites, wherein the vehicle is an autonomous vehicle.

8. The system as claim 1 recites, wherein the instructions further comprise:
   determining, based at least in part on the sensor data, one or more real objects in the environment; and
   merging the one or more simulated objects and one or more real objects into a group of objects,
   wherein the one or more simulated objects are indistinguishable from the one or more real objects for determining the trajectory.

9. A computer-implemented method comprising:
   generating a simulated scenario associated with one or more primitives, the simulated scenario being associated with simulated data and the one or more primitives representative of one or more simulated objects;
   while a vehicle is operating in an environment:
      receiving sensor data from one or more sensors associated with the vehicle in the environment;
      determining perception data based at least in part on the sensor data;
      merging the simulated data and the perception data to generate aggregated data; and
      determining, based at least in part on the aggregated data, a trajectory along which the vehicle is to drive in the environment by considering the one or more simulated objects in the simulated data as real objects in the environment.

10. The computer-implemented method as claim 9 recites, further comprising instantiating the simulated scenario based at least in part on the perception data.

11. The computer-implemented method as claim 9 recites, wherein the one or more sensors comprise one or more of a LIDAR sensor, a camera sensor, a RADAR sensor, or a SONAR sensor.

12. The computer-implemented method as claim 9 recites, wherein the vehicle is an autonomous vehicle, and the computer-implemented method further comprises generating one or more signals for causing the vehicle to drive along the trajectory.

13. The computer-implemented method as claim 9 recites, further comprising evaluating a performance of the vehicle based at least in part on a nominal performance of the vehicle.

14. The computer-implemented method as claim 9 recites, further comprising evaluating a performance of the vehicle based at least in part on one or more formulae indicating a set of driving rules.

15. A non-transitory computer-readable medium having a set of instructions that, when executed, cause one or more processors to perform operations comprising:
   while a vehicle is operating in an environment within which the vehicle is positioned:
      receiving, from one or more sensors, sensor data associated with the environment within which the vehicle is positioned;
      receiving instructions defining simulated data associated with one or more primitives that are to be instantiated in the environment, the one or more primitives being independent of the sensor data and associated with one or more simulated objects represented in the simulated data;
      merging the sensor data and the simulated data to generate aggregated data comprising the one or more simulated objects; and
      determining, based at least in part on the aggregated data, a trajectory along which the vehicle is to drive in the environment by considering the one or more simulated objects in the simulated data as real objects in the environment.

16. The non-transitory computer-readable medium as recited in claim 15, the operations further comprising:
   determining one or more objects in the environment based at least in part on merging the sensor data and the simulated data; and
   determining the trajectory based at least in part on the one or more objects.

17. The non-transitory computer-readable medium as recited in claim 15, the operations further comprising:
   determining, based at least in part on the sensor data, one or more real objects in the environment; and
   determining, based at least in part on the simulated data, one or more simulated objects in the environment,
   wherein merging the sensor data and the simulated data comprises merging the one or more real objects and the one or more simulated objects into a group of objects.

18. The non-transitory computer-readable medium as recited in claim 17, wherein the one or more real objects are indistinguishable from the one or more simulated objects for determining the trajectory.

19. The non-transitory computer-readable medium as recited in claim 15, wherein the simulated data further comprises a sequence defining an association between individual primitives of the one or more primitives.

20. The non-transitory computer-readable medium as recited in claim 15, the operations further comprising:
   determining one or more commands to cause the vehicle to drive along the trajectory;
   executing the one or more commands; and
   assessing a performance of the vehicle based at least in part on executing the one or more commands.

* * * * *